US010843082B2

(12) United States Patent
Kenan

(10) Patent No.: US 10,843,082 B2
(45) Date of Patent: Nov. 24, 2020

(54) COMBINATION OF A NON-WORD BASED GAME WITH A WORD GAME

(71) Applicant: Playtika Ltd., Herzliya Pituach (IL)

(72) Inventor: Lior Kenan, Tel Aviv (IL)

(73) Assignee: Playtika Ltd., Herzliya Pituach (IL)

( * ) Notice: Subject to any disclaimer, the term of this patent is extended or adjusted under 35 U.S.C. 154(b) by 179 days.

(21) Appl. No.: 15/605,845

(22) Filed: May 25, 2017

(65) Prior Publication Data

US 2018/0339231 A1  Nov. 29, 2018

(51) Int. Cl.
| G07F 17/32 | (2006.01) |
| A63F 13/69 | (2014.01) |
| A63F 13/31 | (2014.01) |
| A63F 13/32 | (2014.01) |
| A63F 13/33 | (2014.01) |
| A63F 13/335 | (2014.01) |
| A63F 13/35 | (2014.01) |
| A63F 13/46 | (2014.01) |
| A63F 13/533 | (2014.01) |
| A63F 13/79 | (2014.01) |

(Continued)

(52) U.S. Cl.
CPC .............. *A63F 13/69* (2014.09); *A63F 13/31* (2014.09); *A63F 13/32* (2014.09); *A63F 13/33* (2014.09); *A63F 13/335* (2014.09); *A63F 13/35* (2014.09); *A63F 13/46* (2014.09); *A63F 13/533* (2014.09); *A63F 13/79* (2014.09); *A63F 13/822* (2014.09); *A63F 13/85* (2014.09); *G07F 17/3295* (2013.01); *A63F 2300/8094* (2013.01); *G07F 17/3276* (2013.01)

(58) Field of Classification Search
None
See application file for complete search history.

(56) References Cited

U.S. PATENT DOCUMENTS

| 5,788,573 A * | 8/1998 | Baerlocher ............. G07F 17/32 |
| | | 273/138.2 |
| 6,428,412 B1 * | 8/2002 | Anderson ............... G07F 17/32 |
| | | 463/16 |

(Continued)

FOREIGN PATENT DOCUMENTS

| GB | 2434994 | 8/2007 |
| WO | WO2003/035200 | 5/2003 |

OTHER PUBLICATIONS

How to Win at Wheel of Fortune, William Spaniel, Feb. 25, 2014, The New Republic, https://newrepublic.com/article/116732/wheel-fortune-strategy-how-win-gameshow (Year: 2014).*

(Continued)

*Primary Examiner* — Damon J Pierce
(74) *Attorney, Agent, or Firm* — Fish & Richardson P.C.

(57) ABSTRACT

Methods and systems for combining a computer-implemented word game with a computer-implemented non-word based game. One of the methods includes receiving, at a processor for controlling a game, a first input from a user of the game, the game including both a non-word based game and a skill-based word game, the first input received in response to a display of the non-word based game; providing at least one letter to the user in response to the first input received from the user; and receiving a second input from the user related to playing at least one letter in the word game.

20 Claims, 8 Drawing Sheets

(51) Int. Cl.
    *A63F 13/822* (2014.01)
    *A63F 13/85* (2014.01)

(56) References Cited

U.S. PATENT DOCUMENTS

| | | | |
|---|---|---|---|
| 8,187,068 B2* | 5/2012 | Slomiany | G07F 17/32 |
| | | | 463/16 |
| 2002/0193162 A1 | 12/2002 | Walker | |
| 2010/0035674 A1* | 2/2010 | Slomiany | G07F 17/32 |
| | | | 463/9 |
| 2010/0092933 A1* | 4/2010 | Kuchera | G09B 19/00 |
| | | | 434/185 |
| 2013/0079116 A1* | 3/2013 | Nelson | G07F 17/3227 |
| | | | 463/25 |
| 2014/0106835 A1* | 4/2014 | Small | A63F 13/335 |
| | | | 463/9 |

OTHER PUBLICATIONS

Wheel of Fortune, May 24, 2016, Wayback Machine Archive, https://web.archive.org/web/20160524081135/https://www.wheeloffortune.com/ (Year: 2016).*

Zynga, "Words With Friends" [Mobile application software] Retrieved from https://www.zynga.com/games/words-friends, (Released. Jul. 2009), 2 pages.

Electronic Arts, "Scrabble" [Mobile application software] Retrieved from http://www2.ea.com/scrabble-paid-iphone, (Released Jul. 2008), 4 pages.

International Search Report and Written Opinion in International Application No. PCT/IB2018/053311, dated Aug. 10, 2018, 13 pages.

* cited by examiner

COMBINATION OF A NON-WORD BASED GAME WITH A WORD GAME

BACKGROUND

Technical Field

This specification relates to gaming systems and methods, and more specifically to a computer-implemented word game.

Background

Personal computing devices, especially mobile computing devices, with internet access have grown significantly in popularity. As a result, online gaming has also grown significantly. Online gamers like to experience new challenges. Thus, there is a need for improved games that provide new challenges to online gamers.

SUMMARY

This specification describes technologies for combining a computer-implemented game with a computer-implemented non-word based game. A word game is a game that involves obtaining letters and then forming words on a board (e.g., a virtual board) using the obtained letters. A non-word based game is a game where obtaining letters and then forming words on a board (e.g., a virtual board) using the obtained letters is not the primary purpose of the game. Examples of a non-word based game include bingo and poker. The non-word based game can be a social game such as match-3, hidden objects, and puzzle games.

In general, one innovative aspect of the subject matter described in this specification can be embodied in methods that include the actions of: receiving, at a processor for controlling a game, a first input from a user of the game, the game including both a non-word based game and a skill-based word game, the first input indicating the play of at least one letter in the skill-based word game; providing rewards to the user in response to the first input received from the user; determining if the user's rewards exceed a threshold; and when the user's rewards exceed the threshold providing the user with game currency in the non-word based game.

Providing the user with game currency in the non-word based game can include allowing the user to exchange rewards obtained in the word-based game for game currency in the non-word based game. The method can further include receiving a second input from the user related to the non-word based game and the second input can be using game currency to take an action in the non-word based game. The rewards in the word-based game can be automatically converted to game currency in the non-word based game. The method can further include monitoring a letter rack for the user to determine if the user has a potential word to play and, when the user does not have a word to play, prompting the user to play the non-word based game to obtain more letters for the word based game.

Another innovative aspect of the subject matter described in this specification can be embodied in methods that include the actions of receiving, at a processor for controlling a game, a first input from a user of the game, the game including both a non-word based game and a skill-based word game, the first input related to the non-word based game, the first input received via the non-word based game; providing at least one letter to the user in response to the first input received from the user; and receiving a second input from the user related to playing at least one letter in the skill-based word game.

As noted above, the non-word based game can be a social game. The method can further include: (a) calculating a reward for the user based at least in part on the second input; and (b) receiving a third input from the user related to acquiring, based at least in part on the reward, an item relevant to the non-word based game. The item relevant to the non-word based game can be currency available in the non-word based game. The first input can be at least one of initiating the game and making a purchase within the game.

The method can further include providing a board mission. The board mission can be selected from the group of: completion of a specific word; completion of a word of a specific length; completion of a word with a certain letter; using all the letters in the player's rack to write a word on the board, completing a word of with a specified combination of letters, and completion of a word with a point value of more than a specified amount.

The method can further include presenting an additional word based game board wherein presenting the additional word based game board is triggered by an event in the non-word based game. The method can further include prompting the user to submit a word in the word based game while displaying the non-word based game to the user such that by submitting a word in the word based game the user is able to obtain game currency for the non-word based game. Either the non-word based game or the word based game can be the first game presented to the user. Stated differently the primary game can be a skill based word game and the secondary game can be a social game. Alternatively, the primary game can be a social game and the secondary game can be a skill based word game.

In addition, a user can play against one or more other users as opposed to in solo mode. Solo mode is when a user plays the game and no other user is involved in that particular game.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Combining a word game with a non-word based game (e.g., with a social game such as bingo), into a single game makes the resulting combination more interesting to users. When a user in the social game needs more game currency the user is notified of her ability to gain that currency through the word game, e.g., a skill-based word game. Similarly, when the does not have enough letters to form a word in the word game, the user is notified of the ability to obtain letters by playing the non-word based game. In this way, the two games have a synergistic effect that makes the resulting combined game more interesting and each of the constituent games less frustrating.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for combining a computer-implemented game with a computer-implemented non-word based game. A word game is a game that involves obtaining letters and then forming words on a board (e.g., a virtual board) using the obtained letters. A non-word based game is a game where obtaining letters and then forming words on a board (e.g., a virtual board) using the obtained letters is not the primary purpose of the game. Examples of a non-word based game include bingo, poker, match-3, hidden objects, and puzzles.

Figure 1:
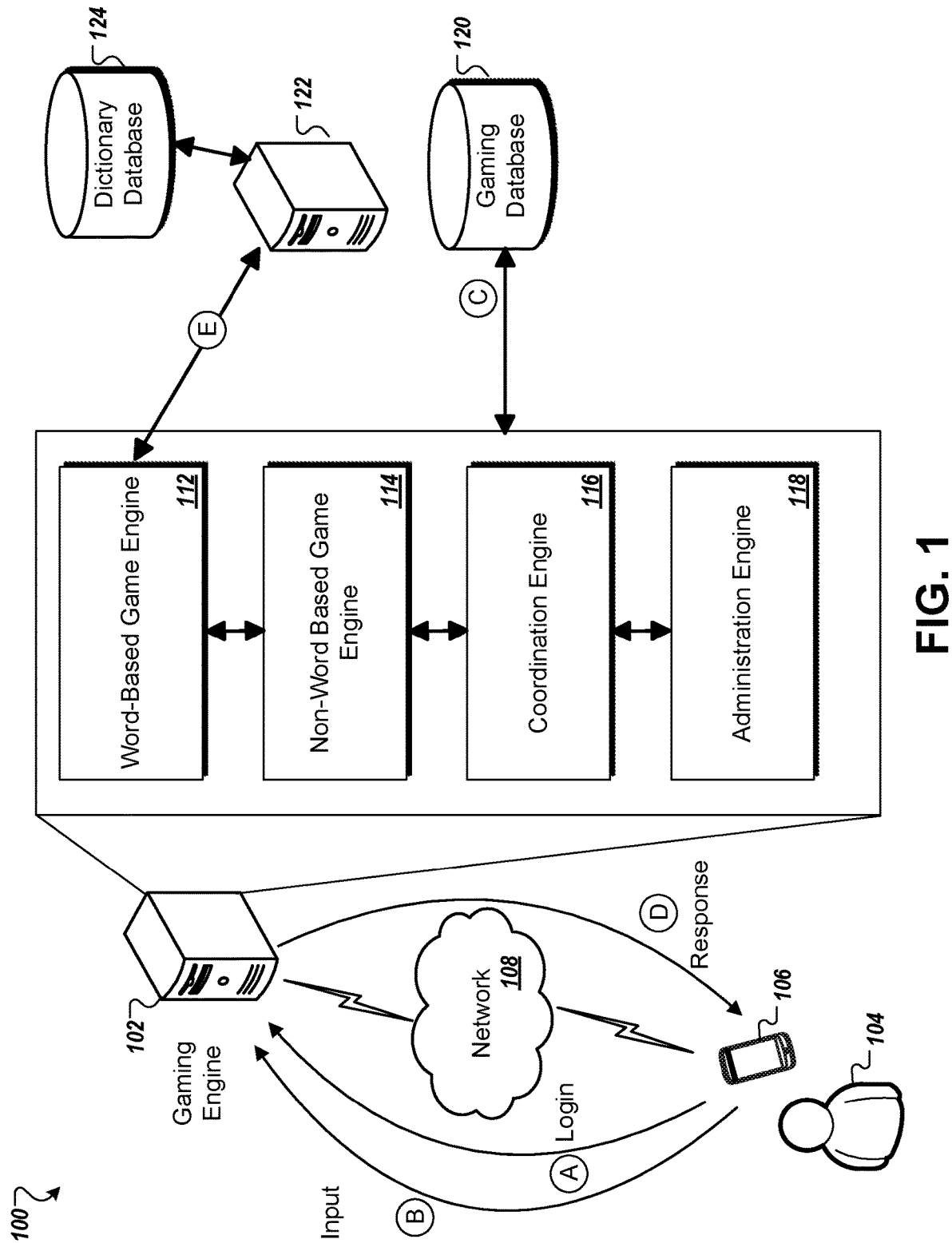
FIG. 1 is a block diagram of a system for implementing a game in accordance with an exemplary embodiment of the present disclosure.

FIG. 1 shows an example gaming system 100 including a gaming engine 102. In operation according to one embodiment, a user 104 using a computing device 106 logs into the gaming engine (step A) and then sends an input (step B) in response to a prompt from the gaming engine. A second user can use the same or a different computing device to access the gaming engine 102. The user can connect with the gaming engine over a network 108.

With reference to FIG. 1, the gaming engine includes a word-based game engine 112 for operating the word game, a non-word based game engine 114 for operating the non-word based game, a coordination engine 116 for managing interactions between the word-based game and the non-word based game, and an administration engine 118 for managing user accounts.

The gaming engine 102 is in communication with a gaming database 120. The gaming database stores data associated both the word-based game engine, the non-word based game engine and the user accounts. In an alternative embodiment, the above-described data can be stored in more than one database. The word based game engine is in communication with a dictionary engine 122. The dictionary engine is communication with a dictionary database 124.

In operation, after a user 104 submits an input (step B) via computing device 106, the gaming engine can access the gaming database 120 (step C) and/or provide a response (step D) to the user computing device. In addition, the word based game can make a request (step E) of dictionary engine 122 to see if any words can be formed from a set of letters held by a user or whether a word proposed by a user is in the dictionary. The dictionary engine 122 and dictionary database 124 can be a service provided by one or more third parties or they can be integrated into the gaming system 100.

Figure 2A:
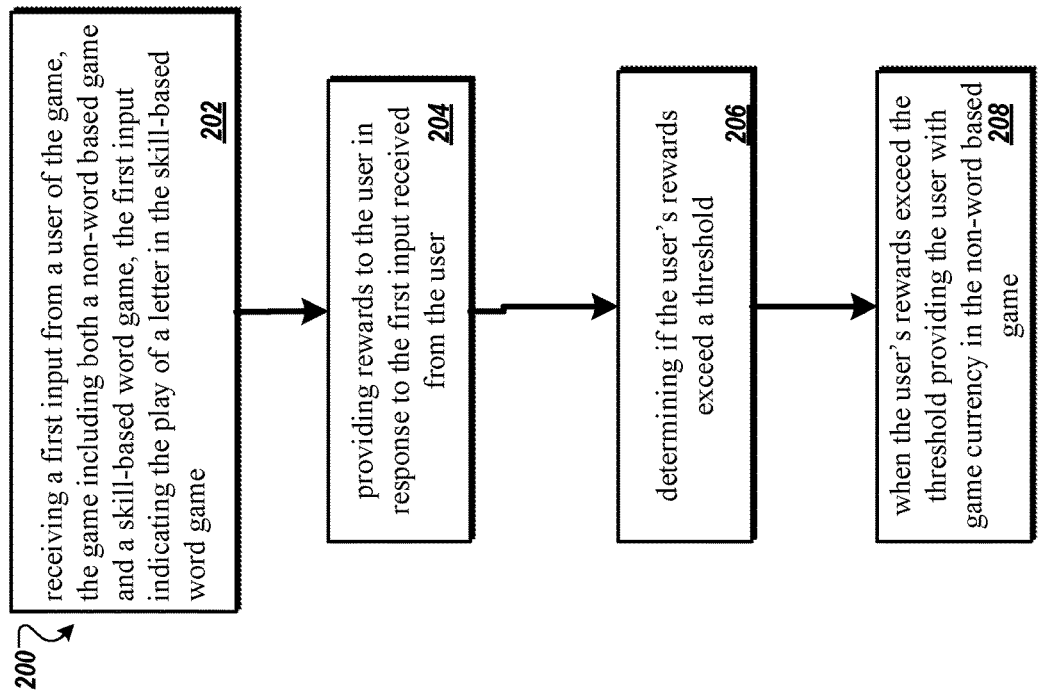
FIGS. 2A and 2B are flow charts showing operation of an application in accordance with an exemplary embodiment of the present disclosure.

Embodiments of the gaming system provide users with a gaming experience that combines a word based game with a non-word based game and allows for interactions between the two types of games. FIG. 2A is a flowchart of an example process 200 for operating a combination word-based game and non-word based game. For convenience, the process 200 will be described as being performed by a system of one or more computers, located in one or more locations, and programmed appropriately in accordance with this specification. For example, a gaming system, e.g., the gaming system 100 of FIG. 1, appropriately programmed, can perform the process 200.

Process 200 includes: receiving 202, at a processor for controlling a game, a first input (e.g., placement of a letter on a word game board) from a user of the game, the game including both a non-word based game and a skill-based word game, the first input related to playing at least one letter in a word game (e.g., a skill based word game); providing 204 rewards to the user in response to the first input received from the user; determining 206 if the user's rewards exceed a threshold; and providing 208 the user with game currency in the non-word based game when the user's rewards exceed the threshold. In other words, there are two rewards in the game. The first reward is simply if the user submits a word which exists in the dictionary. For applying a valid word, the user receives a reward. The second reward is provided when the player's cumulative points cross a certain threshold of points. Each word completed by the user results in the player receiving some points in the game. After the player receives a specified number of points, the player crosses a threshold which boosts the final board award of the player.

Figure 2B:
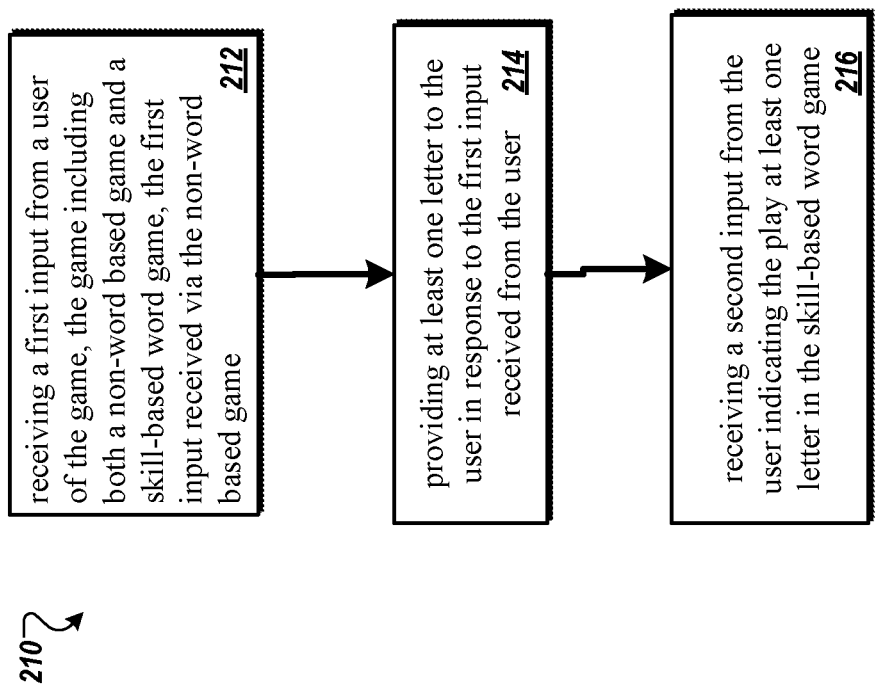

FIG. 2B is a flow chart of an alternative embodiment 210 for operating a combination word-based game and non-word based game. For convenience, the process 210 will be described as being performed by a system of one or more computers, located in one or more locations, and programmed appropriately in accordance with this specification. For example, a gaming system, e.g., the gaming system 100 of FIG. 1, appropriately programmed, can perform the process 210 of FIG. 2A. The process 210 includes: receiving 212, at a processor for controlling a game, a first input from a user of the game, the game including both a non-word based game and a skill-based word game, the first input related to the non-word based game; providing 214 at least one letter to the user in response to the first input received from the user; and receiving 216 a second input from the user related to playing at least one letter in the skill-based word game.

Figure 3:
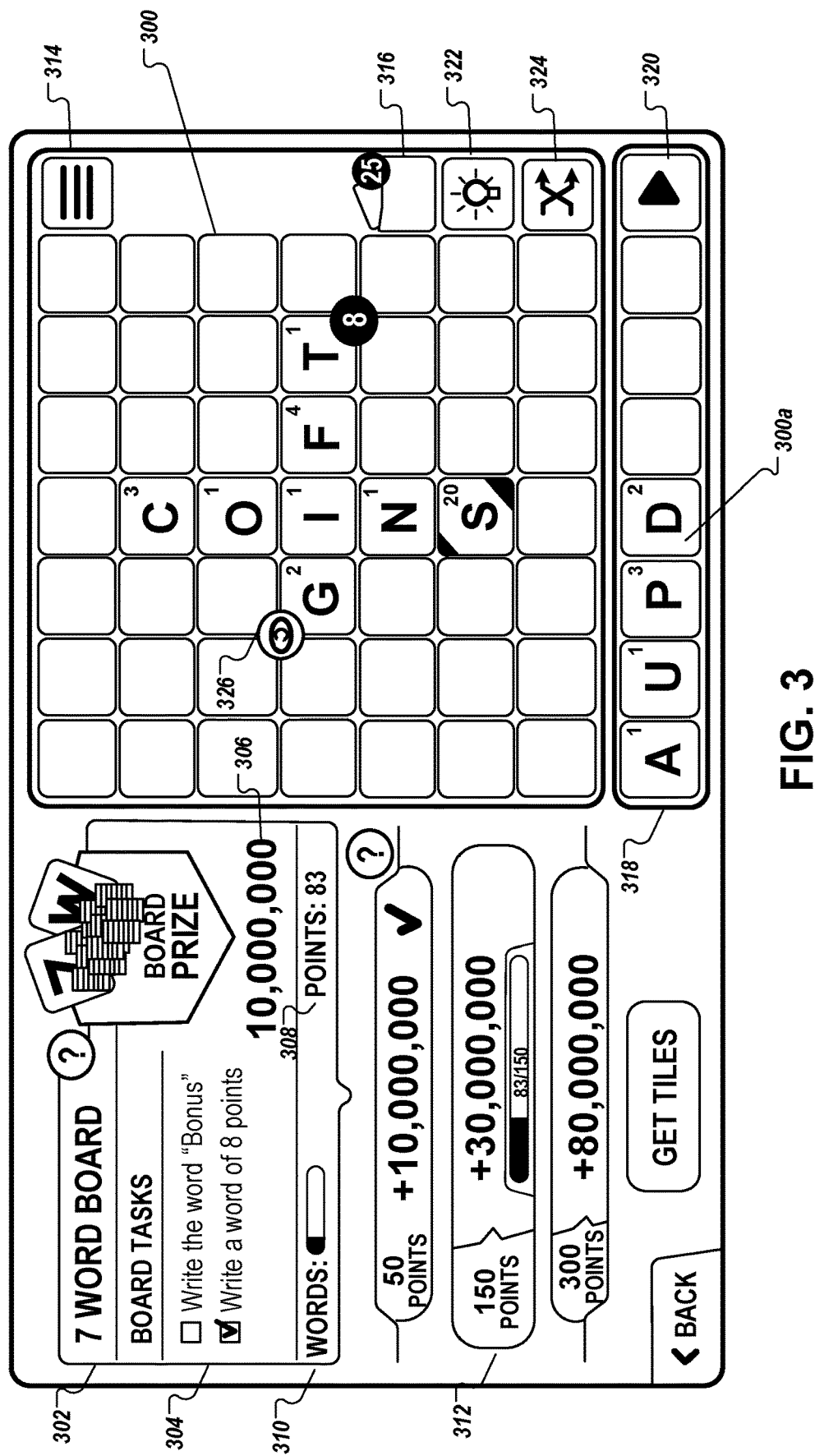
FIG. 3 is a diagram of a word based game board in accordance with an exemplary embodiment of the present disclosure.

FIG. 3 is a diagram of a display of a word based game board 300 and associated features in accordance with an exemplary embodiment of the present disclosure. The display of FIG. 3 is generated by the word based game engine 112 of FIG. 1. The game board 300 includes a set of spaces for letter tiles 300a. The board can be configured as a square, e.g., 5×5, 7×7, 9×9 etc., or in other shapes such as a rectangle.

Associated features displayed next to the game board can include a main board target 302 (e.g., complete a certain number of words) and additional sub-targets e.g., write a word of 8 points. In one embodiment, the additional targets are not mandatory to receive rewards. The display can also include the board prize 306, the points accumulated so far 308, the board progression 310 (i.e., how far along the user is in his effort to complete the board target) and the rewards progression 312. The display can further include an icon 314 that, when selected, allows the user to access a dictionary and game rules.

Figure 5:
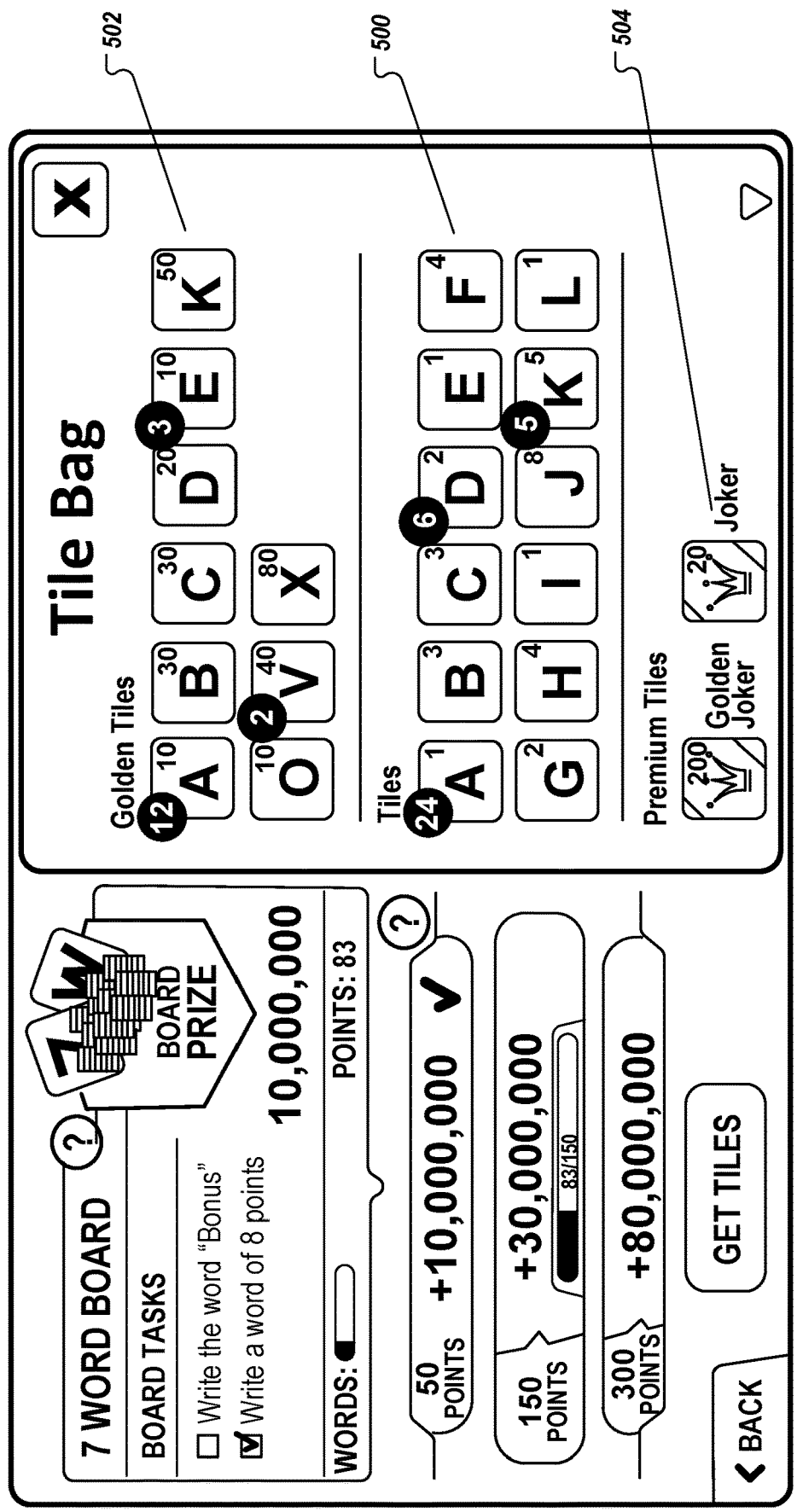
FIG. 5 is a diagram of a tile bag in accordance with an exemplary embodiment of the present disclosure.

The display can further include an icon 316 which when selected triggers a display of the user's letter tile bag as shown in FIG. 5. The illustrated display further includes a letter rack 318 that holds individual letter tiles 300*a*. The user can place individual letters from the letter rack 318 on the game board 300 to form a word. Once a user is satisfied with the word that the user has place on the board, the user can play that word by selecting icon 320.

The display can further include icon 322 that, when selected, provides the user with a hint (e.g., as to a word the user could play based on the user's letters in the user's rack). The illustrated display further includes icon 324 that, when selected, reorders the tiles on the player's rack so that the player can look at his tiles in a different order and perhaps have more ideas for words to form using the letters on his rack.

Figure 4:
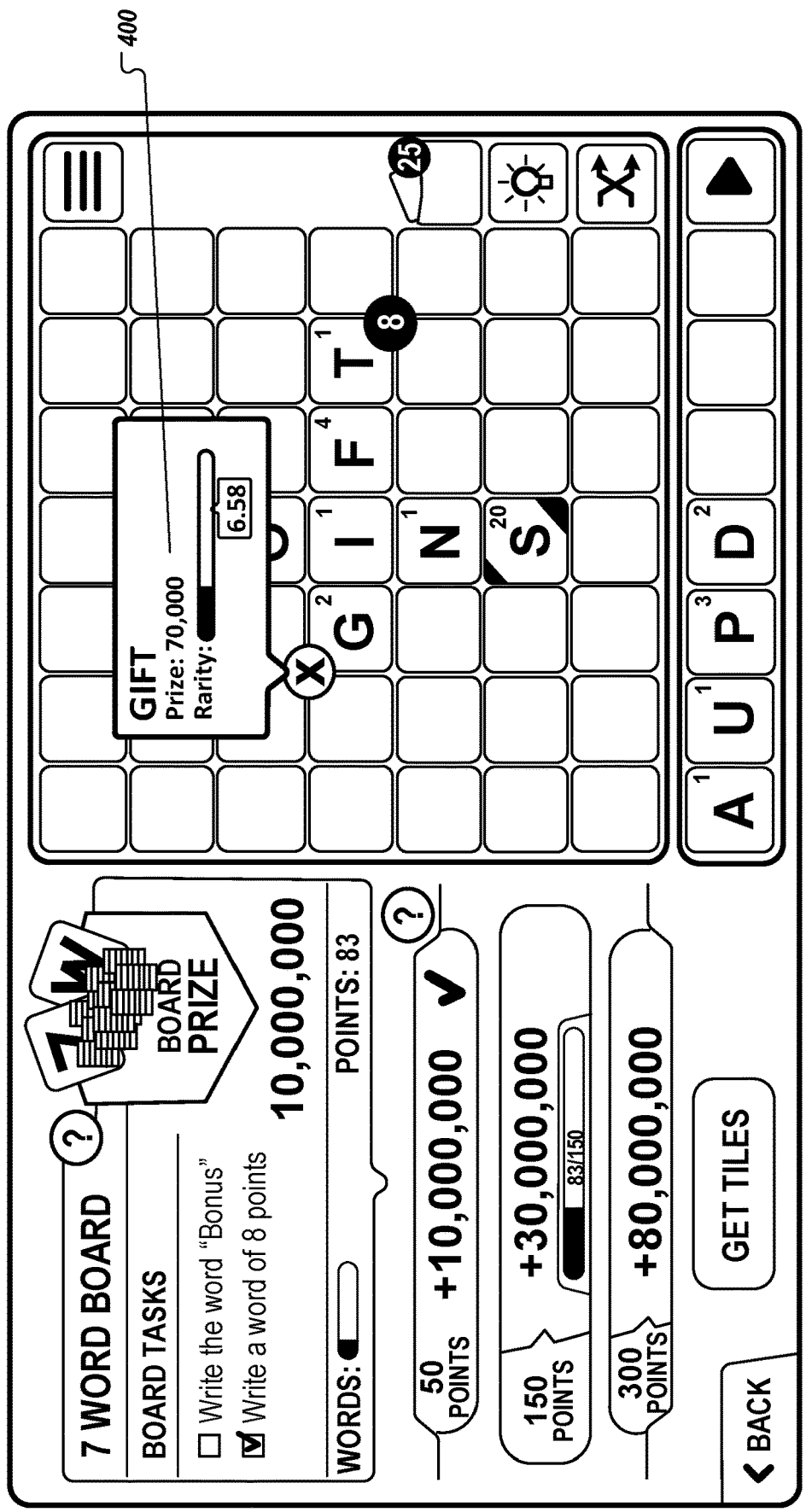
FIG. 4 is a diagram of the word based game board of FIG. 3 showing prize value and rarity of a particular word.

The illustrated display also includes icon 326, e.g., an eye icon, associated with a word, e.g., the word "gift." When a user places tiles on the board (next to one another), this new word will have a validity icon (e.g., a green or red eye). If the word is valid (e.g., green eye), the user can touch the eye icon and he will see the following "tooltip". This "tooltip" has a line of text below the bar that explains the meaning of the strength of the word. FIG. 4 is a diagram of the word based game board of FIG. 3 showing prize value and rarity 400 of a particular word. Instead of rarity, an alternative embodiment could show the strength of the word, where strength can be a comparison of the reward value of the proposed word versus all the possible words the user can play based on the user's letters.

As noted above with reference to FIG. 3 when a user selects icon 316 the word based game engine displays to the user a tile bag display. FIG. 5 is a diagram of a tile bag display in accordance with an exemplary embodiment of the present disclosure. In addition to the normal tiles 500, the tile bag can include golden tiles 502 (tiles with increased points values) and premium tiles 504 (tiles with increased values and that can be used by the user as any letter when spelling a word.

Figure 6:
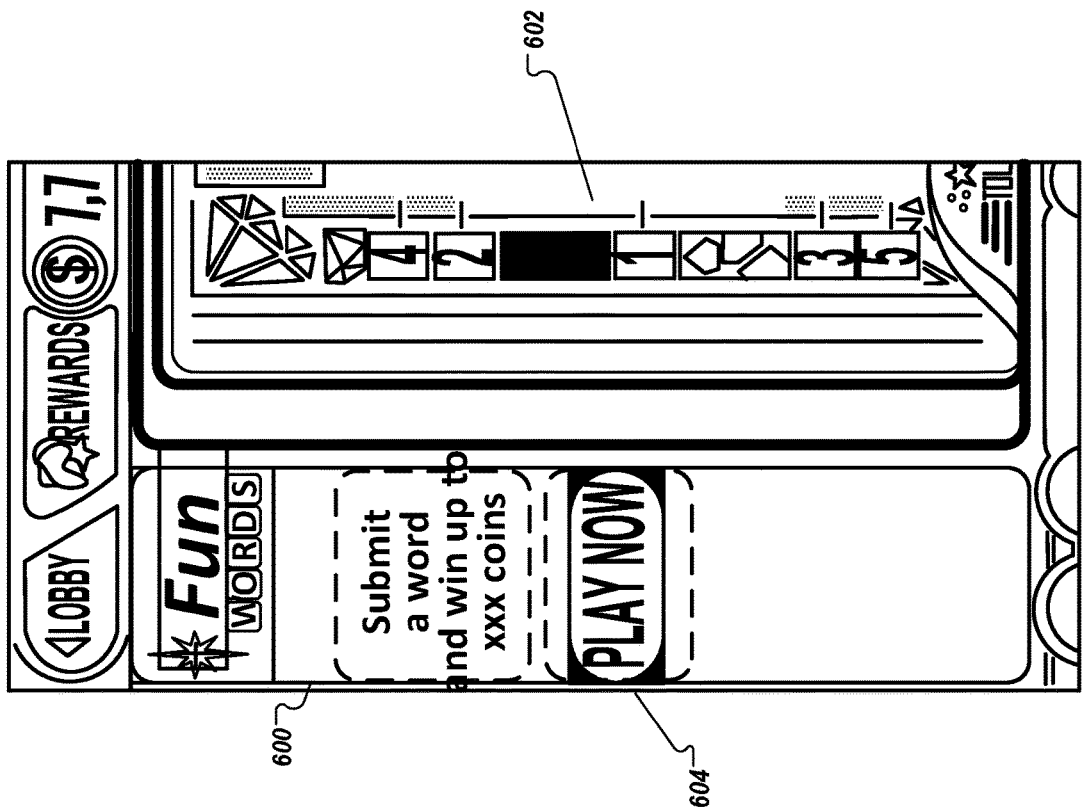
FIG. 6 is a diagram of a side panel prompting a user viewing a non-word based game to submit a word in the word based game to win currency for the non-word based game.

FIG. 6 is a diagram of a side panel 600 prompting a user viewing a non-word based game 602 to submit a word in the word based game to win currency, e.g., currency for the non-word based game. If the user is inspired to act on the prompt, there is a "play now" icon 604 which, when selected, causes the word based game engine to display the word based game board and associated features, e.g., as shown in FIG. 3.

Figure 7:
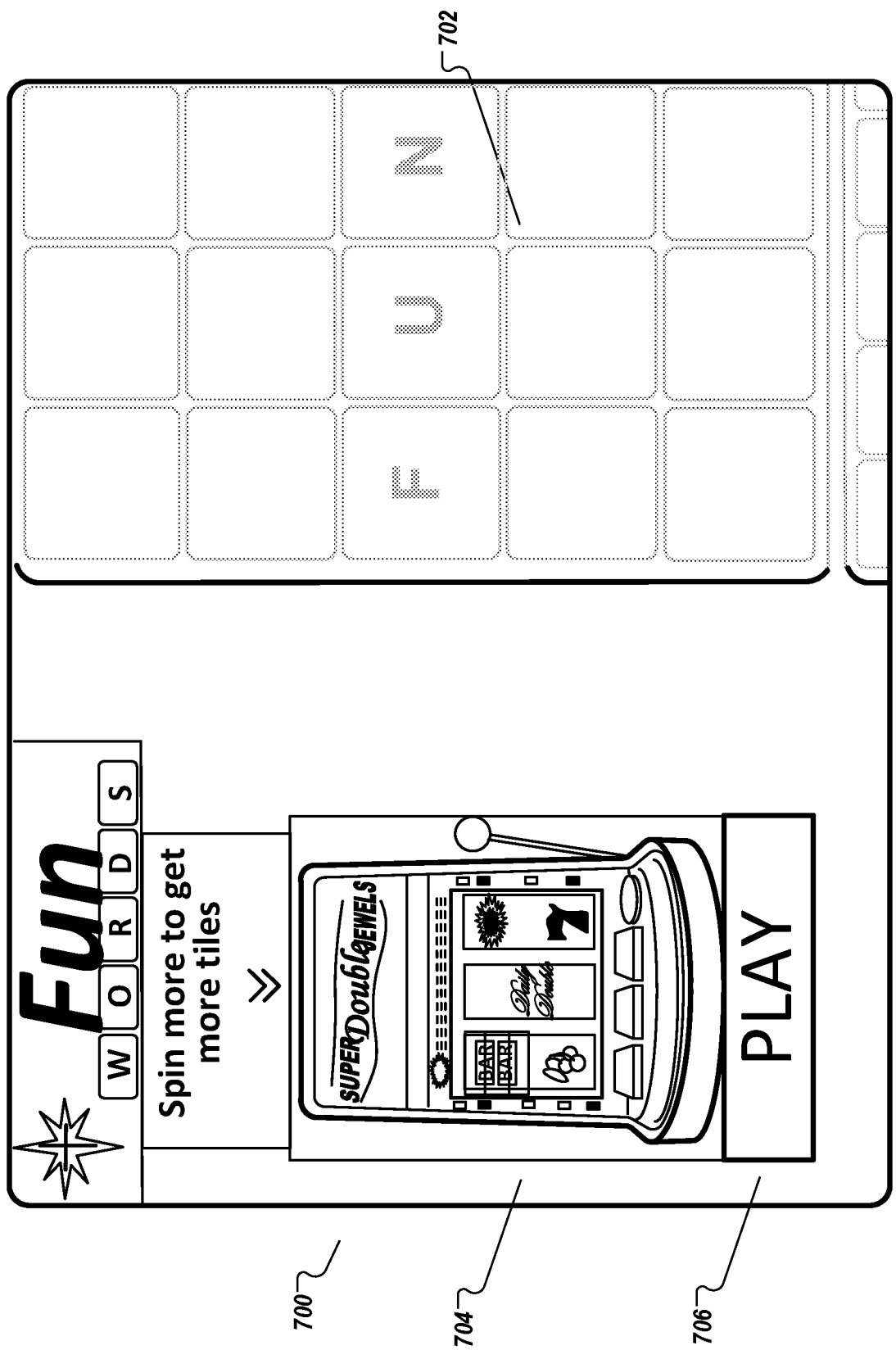
FIG. 7 is a diagram of a side panel prompting a user of a word-based game to play a non-word based game in order to obtain more letter tiles.

FIG. 7 is a diagram of a side panel 700 prompting a user of a word-based game 702 to play a non-word based game 704 in order to obtain more letter tiles. If the user is inspired to act on the prompt, there is a "play" icon 706 which, when selected, causes the non-word based game engine to display the non-word based game.

In certain embodiments, the coordination engine 116 in FIG. 1 monitors activity in the word based game and in the non-word based game to determine when to display the side panels 600 or 700. For example, if the user has run low on tiles or if the tiles the user has cannot be used to form a word, the coordination engine 116 can display side panel 700. Conversely, if the user if running low on game currency in the non-word based game, the coordination engine 116 can display side panel 600.

In certain embodiments, side panel 600 is displayed periodically, e.g., every few seconds, while playing the non-word game and side panel 700 will appear only once in the game.

There can be different messaging on the side panel. For example, the side panel can offer the player a tutorial. During the tutorial, the side panel explain to the player that he receives a new tiles package within X plays in the non-word game.

When the player has enough tiles to write a word on the board, and thus obtain free coins to play the non-word game, the system can display a message to the player, e.g., "Write a word & get XXX Free coins; COLLECT." When the player has only 1 more word to write on the board to obtain the full board prize, the system can display a message to the player, e.g., "One word left to win XXX Board Prize." When a player does not have enough tiles to write words, then the system can display a message to the player, e.g., "Play more to get more tiles."

Other than the side panel, the system can encourage a player to play the word game in at least two other ways. The game can have a gift section, where a player can collect free coins from his friends or from the game, the system can provide a display that states "Play a word on the board and collect XXX free coins" or a similar message. Alternatively or in addition, in the game's lobby, the system can display a promotion stating how many coins a player can obtain if the player completes the board in a specified manner.

A tiles pack function provides players with letter tiles in the game. In some embodiment, the system provides a player with a pack of tiles every specified number of play actions in the non-word game. In certain embodiments, the system will provide a player with tiles by leveling up in the non-word game. Leveling up meaning progressing to the next level in terms of some metric, e.g., difficulty. In other words, the system provides a player with a new pack of tiles when a player progresses up a specified number of levels in the non-word based game. In yet other embodiments, the system provides a player with tiles when the player purchases currency in the non-word game. The higher the player's purchase, the more valuable the tiles, e.g., the more premium tiles, the system provides to the player.

In addition, the system can provide a player with tiles through a daily challenge that the system can introduce in the game, e.g., the system can display a message stating the following: "Every 10th player who finishes his board today, will receive a free tile pack tomorrow."

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In this specification, the term "database" is used broadly to refer to any collection of data: the data does not need to be structured in any particular way, or structured at all, and it can be stored on storage devices in one or more locations.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   (a) receiving, at a processor for controlling a single game, a first input from a user of the game, the game including both a non-word based game and a skill-based word game wherein the skill-based word game comprises a display that comprises a letter rack that holds individual letter tiles, the first input received in response to a display of the non-word based game;
   (b) upon receiving the first input, determining whether the user has completed a predetermined condition in the non-word based game;
   (c) upon determining that the user has completed the predetermined condition, providing the user with a plurality of letter tiles in the skill-based word game;
   (d) when the user does not have enough letters to form a word in the skill-based word game, notifying the user of the user's ability to obtain at least one letter tile for the user's letter rack by playing the non-word based game;
   (e) when the user's game currency in the non-word based game falls below a specified threshold, notifying the user of the user's ability to gain game currency through the skill-based word game; and
   (f) receiving a second input from the user in the skill-based word game, wherein the second input indicates the play of at least one letter represented by one of the plurality of letter tiles.

2. The method of claim 1, wherein the non-word based game is a social game.

3. The method of claim 1, wherein the method further comprises:
   (a) calculating a reward for the user based at least in part on the second input; and
   (b) receiving a third input from the user related to acquiring, based at least in part on the reward, an item relevant to the non-word based game.

4. The method of claim 3, wherein the item relevant to the non-word based game is currency available in the non-word based game.

5. The method of claim 1, wherein the first input is at least one of initiating the non-word based game and making a purchase within the non-word based game.

6. The method of claim 1, wherein the method further comprises providing a board mission.

7. The method of claim 6, wherein the board mission is selected from the group of: completion of a specific word; completion of a word of a specific length; completion of a word with a certain letter; using all the letters in a player's rack to write a word on a board for the skill-based word game, completing a word with a specified combination of letters, and completion of a word with a point value of more than a specified amount.

8. The method of claim 1, wherein the method further comprises presenting an additional word based game board.

9. The method of claim 8, wherein presenting the additional word based game board is triggered by an event in the non-word based game.

10. The method of claim 1, wherein the method further comprises prompting the user to submit a word in the skill-based word game while displaying the non-word based game to the user such that by submitting a word in the skill-based word game the user is able to obtain game currency for the non-word based game.

11. A system for multi-player network-based gaming, the system comprising a gaming server that communicates with at least two users' communication accounts, the gaming server having a processing unit configured to perform operations comprising:
   (a) receiving a first input from a user for a social game, the social game including both a non-word based game and a skill-based word game wherein the skill-based word game comprises a display that comprises a letter rack that holds individual letter tiles, the first input received in response to a display of the non-word based game;
   (b) upon receiving the first input, determining whether the user has completed a predetermined condition in the non-word based game;

(c) upon determining that the user has completed the predetermined condition, providing the user with a plurality of letter tiles in the skill-based word game;
(d) when the user does not have enough letters to form a word in the skill-based word game, notifying the user of the user's ability to obtain at least one letter tile for the user's letter rack by playing the non-word based game;
(e) when the user's game currency in the non-word based game falls below a specified threshold, notifying the user of the user's ability to gain game currency through the skill-based word game; and
(f) receiving a second input from the user in the skill-based word game, wherein the second input comprises an instruction to play a letter represented by one of the plurality of letter tiles.

12. The system of claim 11, wherein the system comprises a dictionary database and wherein the operations further comprise providing at least two rewards, a first reward provided if the user submits a word in the dictionary database and a second reward provided when a user's cumulative points cross a specified threshold.

13. The system of claim 11, wherein the skill-based word game has a square board.

14. The system of claim 11, wherein the skill-based word game comprises a display that comprises an icon that, when selected, allows the user to access a dictionary and game rules.

15. The system of claim 11, wherein the skill-based word game comprises a display that comprises an icon that, when selected, allows the user to access a user's letter tile bag.

16. The system of claim 11, wherein the skill-based word game has a word game board and wherein the operations further comprise receiving input from the user to place individual letters represented by letter tiles in the letter rack on the word game board.

17. The system of claim 11, wherein the non-word based game comprises a first display prompting a user viewing the non-word based game to submit a word in the skill-based word game to win currency for the non-word based game.

18. The system of claim 17, wherein the skill-based word game comprises a second display prompting a user of the skill-based word game to play the non-word based game in order to obtain at least one more letter tile.

19. The system of claim 18, wherein the system further comprises a coordination engine configured to monitor activity in the skill-based word game and in the non-word based game to determine when to display the first display and when to display the second display.

20. A method comprising:
receiving, at a processor for controlling an integrated game, a first input from a user of the game, the game including both a non-word based game and a skill-based word game wherein the skill-based word game comprises a display that comprises a letter rack that holds individual letter tiles, the first input received in response to a display of the non-word based game;
upon receiving the first input, determining whether the user has completed a predetermined condition in the non-word based game;
upon determining that the user has completed the predetermined condition, providing the user with a plurality of letter tiles in the skill-based word game;
when the user does not have enough letter tiles to form a word in the skill-based word game, notifying the user of the user's ability to obtain at least one letter tile by playing the non-word based game;
when the user's game currency in the non-word based game falls below a specified threshold, notifying the user of the user's ability to gain game currency through the skill-based word game; and
receiving a second input from the user in the skill-based word game, wherein the second input indicates the play of at least one letter represented by one of the plurality of letter tiles.

* * * * *